United States Patent [19]
Purviance

[11] 3,813,888
[45] June 4, 1974

[54] APPARATUS FOR LAYING SUB-SURFACE IRRIGATION PIPE

[76] Inventor: Billy Joe Purviance, 3737 N. Duncan Rd., Linden, Calif. 95236

[22] Filed: Jan. 8, 1973

[21] Appl. No.: 321,765

[52] U.S. Cl.............................. 61/72.6, 61/13
[51] Int. Cl.............................. E02f 5/10, F16l 1/00
[58] Field of Search......... 61/72.6, 72.5, 72.7, 72.1, 61/13; 198/DIG. 18; 254/190; 37/193

[56] References Cited
UNITED STATES PATENTS
2,909,134  10/1959  Kniefel........................ 61/72.6
3,668,879  6/1972  Ogle............................ 61/72.6

*Primary Examiner*—Jacob Shapiro
*Attorney, Agent, or Firm*—Roger B. Webster

[57] ABSTRACT

The apparatus is of the general type employed to lay, sub-surface and to a controlled depth, a continuous run of relatively small-gauge plastic irrigation pipe initially disposed atop the ground. The apparatus functions, as it moves along said run of pipe, to first open a narrow trench in the soil, and to then progressively guide and depress the pipe into the trench by means of a pipe guide and depressing unit which extends into the trench from above the ground; the pipe—as laid in the trench—being held in place by filling said trench with soil. The pipe guide and depressing unit, and to which the present invention essentially relates, is formed in a fashion to permit—while progressively guiding and depressing the pipe into the trench—unobstructed passage through said unit of risers connected at intervals to the pipe.

7 Claims, 10 Drawing Figures

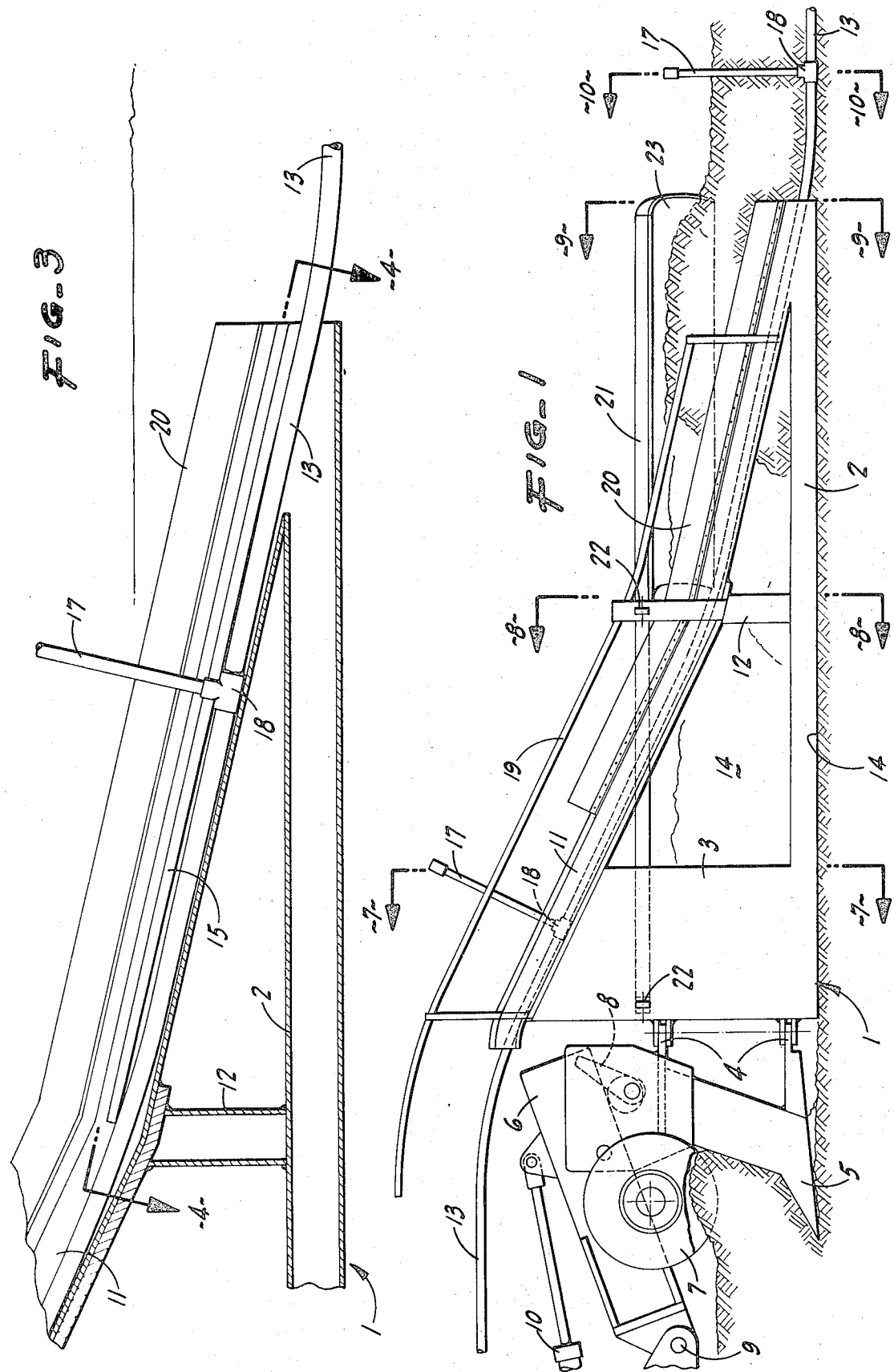

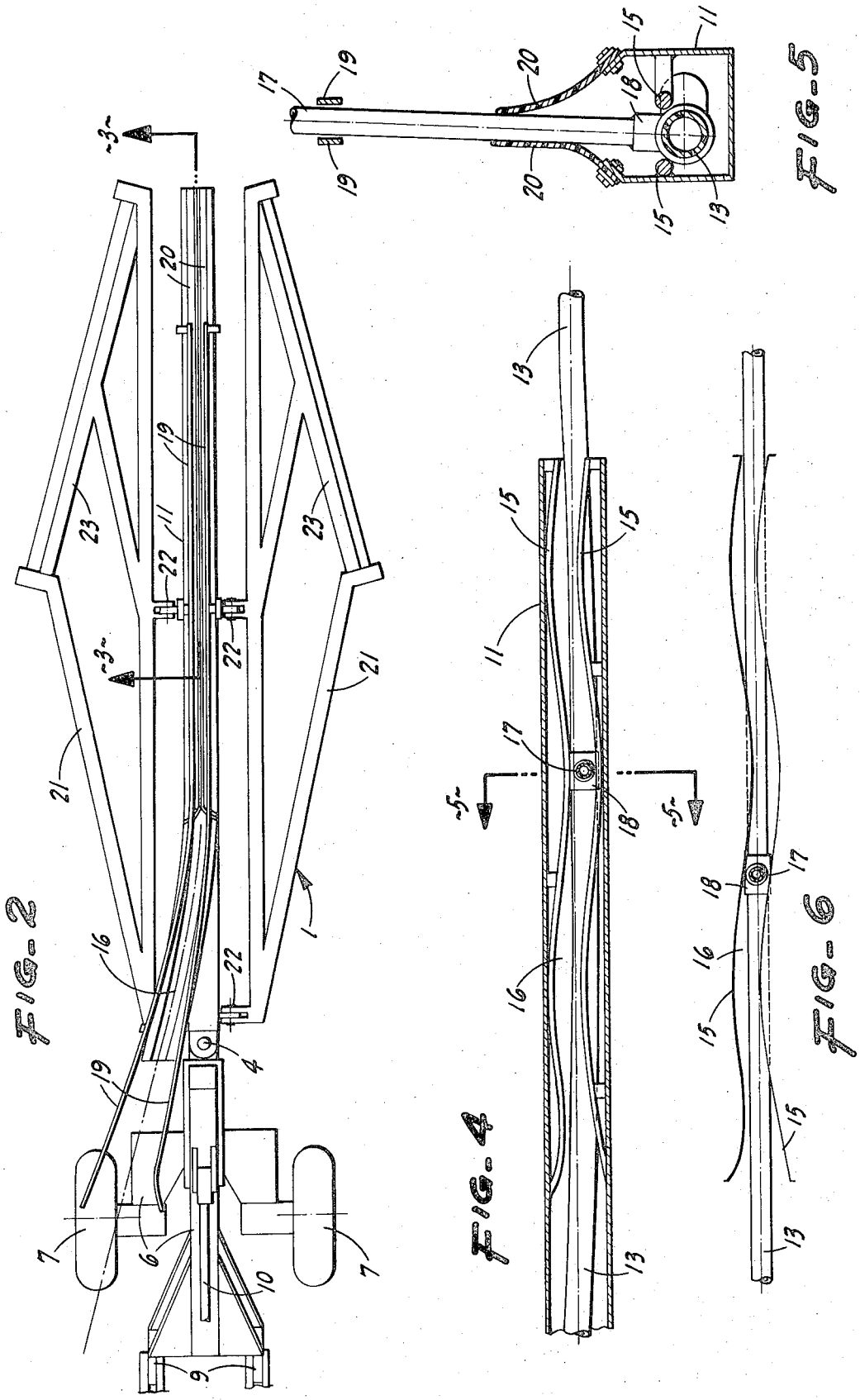

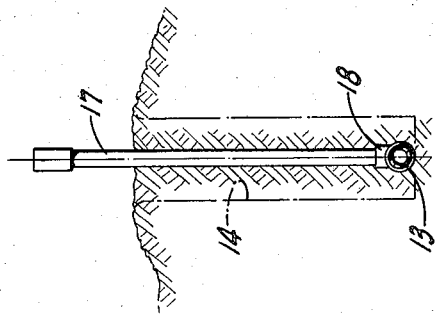
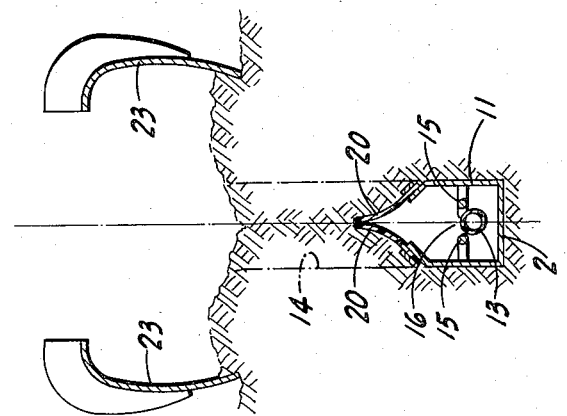
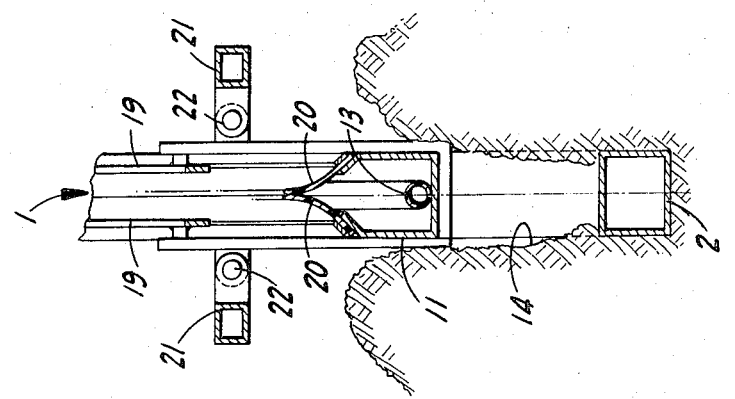
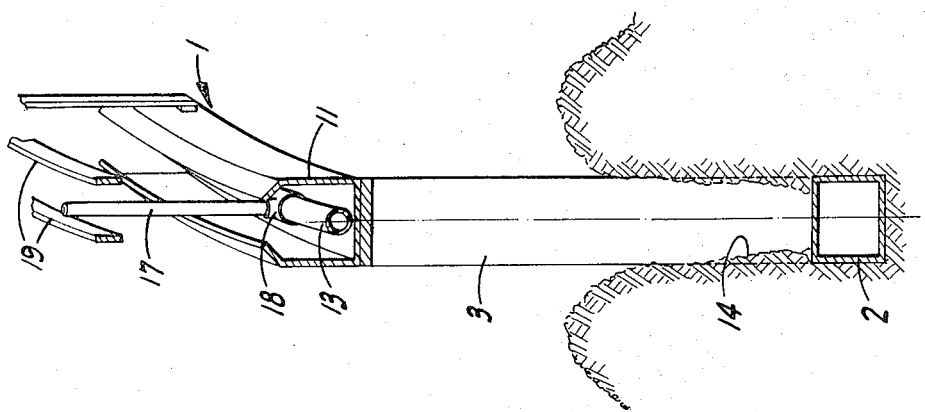

APPARATUS FOR LAYING SUB-SURFACE IRRIGATION PIPE

BACKGROUND OF THE INVENTION

Apparatus is known for the purpose of sub-surface laying of a continuous run of plastic irrigation pipe; the pipe—which is of relatively small gauge and stiff, but somewhat flexible and resilient—being initially disposed atop the ground and includes, at intervals, upstanding risers. The apparatus, which advances along said run of pipe, first opens a trench and then progressively guides and depresses the pipe into the trench by means of a pipe guide and depressing unit which extends into the trench from above ground; the pipe, as laid in the trench, being held in place by filling the latter with soil. The pipe guide and depressing unit must be formed to permit—while progressively depressing the pipe into the trench—unobstructed passage through said unit of the risers. The present invention was conceived in a successful effort to provide pipe-laying apparatus, as above, which is of an improved structure and function, particularly with respect to the included pipe guiding and depressing unit.

SUMMARY OF THE INVENTION

The present invention provides, in pipe-laying apparatus of the type described, an improved pipe guiding and depressing unit; such unit being comprised of a pipe guide channel which extends at a downward and rearward incline into the trench formed to receive the pipe, and such guide channel being fitted, at the top thereof, with a pair of longitudinal, side-by-side or transversely spaced, parallel pipe hold-down rods which are of laterally undulating or serpentine form; the space or slot between such hold-down rods being of sufficient width to permit of unobstructed passage of the risers which upstand, at intervals, from the pipe as it relatively moves beneath such rods. However, while the pipe may in many instances be of an outside diameter less than the lateral spacing of the pipe hold-down rods, such pipe is—by reason of the undulating or serpentine form of such rods and the slot therebetween, and which form the pipe cannot assume—effectively prevented from upward escape between such rods.

The present invention provides an improved pipe guiding and depressing unit, as above, wherein the guide channel is fitted, above the pipe hold-down rods, with flexible and resilient, longitudinally extending dirt shields secured to the upper edges of the sides of the channel and converging upwardly therefrom to normal but yieldable engagement at their upper edges; the upstanding risers causing yielding of said dirt shields progressively as the risers relatively move rearwardly between such dirt shields. Also, as the cooperating dirt shields are of a length and position to prevent any substantial access of soil into the portion of the guide channel which runs in the trench, filling of the latter with soil can be initiated—by crowder blades which the apparatus includes—at a point directly above said portion of the channel. As a consequence, the apparatus is, desirably, of a length materially less than would be the case if the crowder blades were entirely to the rear of the pipe guide channel.

The present invention provides, in association with the improved pipe guiding and depressing unit, as in the preceding paragraph, a longitudinal, aboveground wing frame at each side of said channel, and such wing frames being mounted for up and down floating motion; the respective crowder blades being secured to such wing frames and engaging the ground at corresponding sides of the trench whereby the blades—which converge rearwardly—deliver soil into the trench from both sides as the apparatus advances.

The present invention provides, as a further object, a pipe-laying apparatus which is designed for ease and economy of manufacture.

The present invention provides, as a still further object, a practical, reliable, and durable pipe-laying apparatus, and one which is exceedingly effective for the purpose for which it is designed.

BRIEF DESCRIPTION OF THE DRAWINGS

FIG. 1 is a side elevation of the apparatus as in use.

FIG. 2 is a plan view of the apparatus.

FIG. 3 is an enlarged, fragmentary sectional elevation taken substantially on line 3—3 of FIG. 2.

FIG. 4 is a fragmentary sectional plan taken substantially on line 4—4 of FIG. 3; the view showing one position of lateral deflection of the pipe in relation to the hold-down rods.

FIG. 5 is a transverse sectional elevation on line 5—5 of FIG. 4.

FIG. 6 is a fragmentary diagrammatic plan similar to FIG. 4, but shows the pipe in a position without lateral deflection.

FIGS. 7, 8, 9, and 10 are transverse sectional elevations taken substantially on lines 7, 8, 9, and 10, respectively, on FIG. 1.

DESCRIPTION OF THE PREFERRED EMBODIMENT

Referring now more particularly to the drawings and to the characters of reference marked thereon, the apparatus includes a trailing frame, indicated generally at 1, comprised of a longitudinal beam 2 having an upstanding post structure 3 at its forward end; such post structure 3 being connected, by vertically alined pivots 4, to the rear of a trenching plow 5 carried by a tool bar 6 fitted with depth gauge wheels 7. The working angle of the plow 5 is adjustable by suitable means indicated in part at 8. The tool bar 6 is pivotally hitched, as at 9, to the rear of a tractor (not shown), and said tool bar is adjustable up and down by a power cylinder 10.

The pipe guide and depressing unit of the apparatus comprises the following:

A longitudinal pipe guide channel 11, of trough-like form, is disposed above the trailing frame 1, and mounted in connection therewith by the post structure 3 at the forward end, by a standard 12 at an intermediate point, and by the beam 2 at the rear end. Such pipe guide channel 11 extends, from above the post structure 3, at a downward and rearward incline, with the angle of inclination reduced somewhat in the portion rearwardly of the standard.

At its upper end portion, the pipe guide channel 11 is slightly curved laterally outwardly, as shown in FIG. 2, to facilitate entry of the irrigation pipe 13 into such end of said channel. As is usual, the pipe—from the continuous run thereof on the ground—is, as the tractor advances, progressively picked up from the ground and thence relatively moves over and along one side of the tractor; hence the necessity of disposing the upper end of the guide channel 11 as above described and to attain proper entry of the pipe into said guide channel.

The irrigation pipe 13 is of plastic, relatively small in gauge, and stiff but somewhat flexible and resilient. The pipe 13 is preferably of P.V.C. type.

When the apparatus is in use and pulled forward by the tractor, the trenching plow 5 (pre-set to run at a selected depth) opens a relatively narrow trench 14 in which the trailing frame 1 advances; the longitudinal beam 2 riding on the bottom of the trench, the post structure 3 being mainly in but projecting in part above the trench, and the pipe guide channel 11 extending from its aboveground upper end, downwardly rearwardly into the trench and to its lower end at the bottom of said trench.

With the tractor advancing and the pipe 13 feeding into and through the pipe guide channel 11, the pipe is maintained against upward escape from such channel by means of a pair of longitudinal, laterally spaced hold-down rods 15 which extend along said channel above the bottom thereof and from a point intermediate its ends to the lower end thereof. The hold-down rods 15 are each fixed, by suitable means, to the corresponding side of channel 11.

The hold-down rods 15 are of a laterally undulating or serpentine form and are spaced apart in parallelism so as to define a full-length, open-end slot 16 of like configuration and of a width to permit of unobstructed passage along such slot of the risers 17 which upstand at intervals from the pipe 13. The risers 17 are connected to the pipe 13 by T-fittings 18. However, while the pipe 13 may in many instances be of an outside diameter less than the width of slot 16, such pipe is—by reason of the undulating or serpentine form of the hold-down rods 15 and slot 16, and which form the pipe cannot assume—effectively prevented from upward escape through such slot. As the risers 17 and T-fittings 18 move along in the serpentine slot 16 and shift laterally back and forth, there is a recurrent bowing—alternately from a straight line and to one side and then the other—of pipe 13, but such bowing is on a radius such that the pipe never assumes the configuration of the slot 16, and hence parts of the rods 15 (see FIGS. 4 and 6) always exert a hold-down effect on the pipe as it feeds in the guide channel 11 and discharges at the lower end thereof onto the bottom of the trench 14.

In order to maintain the risers 17 in an upright position as they travel along the guide channel 13, a pair of longitudinally extending, laterally spaced guide bars 19 are mounted, in suitable fashion, in connection with and a distance above said guide channel 13 in centrally disposed relation to the same; the risers 17 running between such guide bars 19 (see FIGS. 1 and 5). The lateral spacing of the guide bars 19 is such as to permit of free travel of the risers 17 therebetween, and to preclude any binding as such risers follow, at their lower ends, the undulating or serpentine slot 16 (see FIG. 5).

The pipe guide channel 11 is fitted—from an aboveground point thereon, and thence to its lower end—with a pair of longitudinally extending, upwardly projecting dirt shields 20 of heavy-duty, relatively stiff but flexible and resilient material such as reinforced rubber belting. Such dirt shields 20 are secured—as shown—at their lower edges to the upper edges of the sides of said channel 12; the dirt shields thence inclining upwardly and laterally inwardly to a normal closure line at their upper edges. While preventing access—from above—of dirt into the belowground portion of pipe guide channel 11, the dirt shields 20 yield at said normal closure line to permit the passage of the risers 17 (see FIG. 5).

The trailing frame 1 is fitted on each side with an elongated, longitudinally extending wing frame 21 pivoted, as at 22, for vertical floating motion; each wing frame 21 having a soil crowder blade 23 mounted thereon, with such blade resting on the ground when the apparatus is in use. The crowder blades 23 converge in a rearward direction and are disposed to refill the trench 14 (with soil initially deposited atop the ground by plow 5) in the zone of the rear portion of the pipe guide channel 11 (see FIG. 9); this being of twofold advantage. Firstly, as the trench is filled in the zone of the rear portion of pipe guide channel 11, the apparatus can be constructed of shorter length than would be the case if the crowder blades 23 trailed said channel. Secondly, by filling the trench in the zone of the rear portion of channel 11, the pipe—as laid in the bottom of the trench 14—is covered by soil and hence effectively held in place when such pipe delivers from the lower end of channel 11 (see FIG. 10).

Although the described pipe guide and depressing unit (including pipe guide channel 11 and the undulating or serpentine form hold-down rods 15) is especially adapted for use with a pipe 13 having risers 17, it is to be recognized that such unit will function to guide and depress a pipe which has no risers.

With the apparatus of the present invention, and embodying said pipe guide and depressing unit, a run of pipe can be effectively and rapidly laid—sub-surface and to a controlled depth—in a smooth and continuous manner, with no possibility of the pipe upwardly escaping from the pipe guide channel 11.

From the foregoing description, it will be readily seen that there has been produced such a pipe laying apparatus as substantially fulfills the objects of the invention, as set forth herein.

While this specification sets forth in detail the present and preferred construction of the pipe laying apparatus, still in practice such deviations from such detail may be resorted to as do not form a departure from the spirit of the invention as defined by the appended claims.

I claim:

1. Apparatus, for sub-surface laying of a continuous run of plastic irrigation pipe having risers upstanding therefrom, comprising a tractor-drawn trenching plow, a frame trailing the plow and running in the trench formed thereby, and a pipe guide and depressing unit on the frame adapted to guide a relatively moving pipe into the trench and to depress such pipe therein for discharge at a point adjacent the bottom of said trench; characterized by said unit including a pipe guide channel extending into the trench at a downward and rearward incline, and pipe hold-down means on the channel comprising laterally spaced, parallel, continuous members forming an elongated, longitudinal, open-ended slot of laterally serpentine form and of a width to permit of free passage of the risers on the pipe while at the same time said members prevent upward escape of the pipe through such slot.

2. Apparatus, as in claim 1, including rearwardly converging crowder blades mounted in connection with the trailing frame and in ground engagement with the trench therebetween; the crowder blades being disposed in the zone of said hold-down means and operative to fill the trench in said zone with soil, and shield means extending over the channel effective to prevent access thereinto of soil so filled into the trench yet permitting of free passage of the risers on the pipe.

3. Apparatus, as in claim 2, including wing frames mounted on the sides of the trailing frame for vertical floating motion; the crowder blades being secured to corresponding wing frames.

4. Apparatus, as in claim 1, in which said continuous members are a pair of laterally spaced rods of serpentine form; the rods being fixed in connection with corresponding sides of the channel.

5. Apparatus, for sub-surface laying of a continuous run of plastic irrigation pipe having risers upstanding therefrom, comprising a tractor-drawn trenching plow, a frame trailing the plow and running in the trench formed thereby, and a pipe guide and depressing unit on the frame adapted to guide a relatively moving pipe into the trench and to depress such pipe therein for discharge at a point adjacent the bottom of said trench; characterized by said unit including a pipe guide channel extending into the trench at a downward and rearward incline, and pipe hold-down means on the channel forming an elongated, longitudinal, open-ended slot of laterally serpentine form and of a width to permit of free passage of the risers on the pipe while at the same time said means prevents upward escape of the pipe through such slot; there being rearwardly converging crowder blades mounted in connection with the trailing frame and in ground engagement with the trench therebetween, the crowder blades being disposed in the zone of said hold-down means and operative to fill the trench in said zone with soil, and shield means on the channel effective to prevent access thereinto of soil so filled into the trench yet permitting of free passage of the risers on the pipe; the shield means on the channel comprising a pair of longitudinally extending, upwardly projecting shields of relatively stiff but flexible and resilient material, said shields being secured at their lower edges to the upper edges of the sides of the channel and thence inclining upwardly and laterally inwardly to a normal closure line at their upper edges, and the shields yielding at such normal closure line to permit the said free passage of the risers.

6. Apparatus, for sub-surface laying of a continuous run of plastic irrigation pipe having risers upstanding therefrom, comprising a tractor-drawn trenching plow, a frame trailing the plow and running in the trench formed thereby, and a pipe guide and depressing unit on the frame adapted to guide a relatively moving pipe into the trench and to depress such pipe therein for discharge at a point adjacent the bottom of said trench; characterized by said unit including a pipe guide channel extending into the trench at a downward and rearward incline, and pipe hold-down means on the channel forming an elongated, longitudinal, open-ended slot of laterally serpentine form and of a width to permit of free passage of the risers on the pipe while at the same time said means prevents upward escape of the pipe through such slot; there being a centrally longitudinally split but normally closed, flexible dirt shield on the channel over said pipe hold-down means, and said flexible dirt shield yielding at the split to permit said free passage of the risers.

7. Apparatus, as in claim 6, including blade means mounted in connection with the trailing frame and operative to fill the trench with soil in the zone of such shield.

* * * * *